(12) United States Patent
Draak et al.

(10) Patent No.: US 11,936,201 B2
(45) Date of Patent: Mar. 19, 2024

(54) WIRELESS POWER TRANSFER

(71) Applicant: KONINKLIJKE PHILIPS N.V., Eindhoven (NL)

(72) Inventors: Johannes Wilhelmus Draak, Horst (NL); Klaas Jacob Lulofs, Veldhoven (NL); Pascal Leonard Maria Theodoor Lebens, Eindhoven (NL); Andries van Wageningen, Wijlre (NL)

(73) Assignee: Koninklijke Philips N.V., Eindhoven (NL)

( * ) Notice: Subject to any disclaimer, the term of this patent is extended or adjusted under 35 U.S.C. 154(b) by 190 days.

(21) Appl. No.: 17/640,856

(22) PCT Filed: Sep. 4, 2020

(86) PCT No.: PCT/EP2020/074801
§ 371 (c)(1),
(2) Date: Mar. 7, 2022

(87) PCT Pub. No.: WO2021/048019
PCT Pub. Date: Mar. 18, 2021

(65) Prior Publication Data
US 2022/0337093 A1  Oct. 20, 2022

(30) Foreign Application Priority Data

Sep. 9, 2019 (EP) .................................... 19196160

(51) Int. Cl.
*H02J 50/12* (2016.01)
*H02J 50/80* (2016.01)
*H04B 5/00* (2006.01)

(52) U.S. Cl.
CPC ............. *H02J 50/12* (2016.02); *H02J 50/80* (2016.02); *H04B 5/0037* (2013.01)

(58) Field of Classification Search
None
See application file for complete search history.

(56) References Cited

U.S. PATENT DOCUMENTS

2015/0035381 A1* 2/2015 Mach ...................... H02J 50/12
                                                         307/104
2015/0155918 A1 6/2015 Van Wageningen
(Continued)

FOREIGN PATENT DOCUMENTS

KR         20180074461 A1       7/2018

OTHER PUBLICATIONS

WPC: The QI Wireless Poewer Transfer System-Power Class 0 Specification—Parts 1 and 2 Feb. 1, 2017.
(Continued)

*Primary Examiner* — Jared Fureman
*Assistant Examiner* — Aqeel H Bukhari

(57) ABSTRACT

A wireless power transmitter (101) an output circuit (203, 103) comprises a transmitter coil (103) for which generates the power transfer signal a drive signal generated by a driver circuit (201) is applied. A power loop controller (209) implements a power control loop for controlling the drive signal to adjust a power level of the power transfer signal in response to power control error messages received from the power receiver (105). A mode store (213) stores a plurality of power level modes for the power receiver where each power level mode is associated with a reference power level for the power transfer signal. A mode circuit (211) adapts the drive signal to set the power level of the power transfer signal to a first reference value in response to receiving a mode request message where the first reference value corresponds to a reference power level for a first power level mode indicated in the mode request message.

21 Claims, 8 Drawing Sheets

(56) References Cited

U.S. PATENT DOCUMENTS

2015/0303700 A1    10/2015  Nakano
2018/0219419 A1*   8/2018   Ettes .................... H04B 5/0093
2018/0278099 A1    9/2018   Hong et al.
2022/0285988 A1*   9/2022   Partovi ................. G06F 1/1635

OTHER PUBLICATIONS

International Search Report and Written Opinion from PCT/EP2020/074801 dated Oct. 16, 2020.

* cited by examiner

WIRELESS POWER TRANSFER

CROSS-REFERENCE TO PRIOR APPLICATIONS

This application is the U.S. National Phase application under 35 U.S.C. § 371 of International Application No. PCT/EP2020/074801, filed on Sep. 9, 2020, which claims the benefit of EP Patent Application No. EP 19196160.6, filed on Sep. 9, 2019. These applications are hereby incorporated by reference herein.

FIELD OF THE INVENTION

The invention relates to operation of a wireless power transfer system and in particular, but not exclusively, to approaches for supporting varying power levels in a wireless power transfer system such as Qi.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply where power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website:
http://www.wirelesspowerconsortium.com/index.html, where in particular the defined Specification documents can be found.

Qi originally in version 1.0 defined low power wireless power transfer which in practice was limited to lower power levels below 5 W. This has been extended to higher power levels in subsequent versions, and version 1.2. e.g. providing compliance testing addressed at power levels up to 15 W.

In order to control and adapt the power transfer, wireless power transfer systems typically implement a power control loop where the power receiver during power transfer continuously transmits power error control messages to the power transmitter which responds by increasing or decreasing the power level accordingly. Such a power control loop typically provides an efficient way for the power receiver to control the level of power that is transferred from the power transmitter. However, the exact design of such a power control loop is challenging and involves a number of trade-offs which inherently result in suboptimal performance. For example, it is desired for the power control loop to react quickly to changes in required power while it is at the same time desired that the loop is stable and resilient to noise.

Hence, an improved approach for wireless power transfer would be advantageous, in particular, an approach allowing increased flexibility, reduced cost, reduced complexity, improved support for large power ranges, improved transient power performance, improved adaptability, backwards compatibility, improved power transfer operation, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided a power transmitter for wirelessly providing power to a power receiver via an electromagnetic power transfer signal; the power transmitter comprising: a receiver for receiving messages from the power receiver; an output circuit comprising a transmitter coil for generating the power transfer signal in response to a drive signal being applied to the output circuit; a driver circuit for generating the drive signal; a power loop controller implementing a power control loop for controlling the drive signal to adjust a power level of the power transfer signal, the power control loop being arranged to apply changes to the power level of the power transfer signal in response to power control error messages received from the power receiver; a mode store arranged to store a plurality of power level modes for the power receiver, each power level mode being associated with a reference power level for the power transfer signal; a mode circuit arranged to adapt the drive signal to set the power level of the power transfer signal to a first reference value in response to receiving a mode request message, the first reference value corresponding to a reference power level for a first power level mode out of the plurality of power level modes indicated in the mode request message.

The invention may provide improved performance and/or improved power transfer in many scenarios. It may in many embodiments allow an improved and more efficient power transfer over a range of power levels. The approach may in many embodiments support, enable, improve, or facilitate especially high power wireless power transfer.

In many embodiments, an improved switching between different power levels may be achieved, and in particular the transient performance may be improved. The approach may allow the system to utilize the advantages provided by accurate power control loops while mitigating some of the disadvantages of such loops. In particular, stable and reliable power control operation may be combined with fast transient performance.

The use of specific power level modes and messaging from the power receiver may specifically allow power control loop performance and constraints to be overridden at specific times to provide fast transient performance.

The reference power level for a power level mode may be represented by any parameter of e.g. the drive signal or the transmitter coil signal that affects the power level of the power transfer signal, and specifically the amount of power transferred to the power receiver. The reference power level may specifically be a current, voltage, frequency, power, duty cycle, and/or active duration (burst mode) of the drive signal and/or a current, voltage, frequency, power, duty cycle, and/or active duration (burst mode) of the of the signal of the transmitter coil. In many embodiments, the reference power level may be indicated by a coil current of the transmitter current.

The reference power level for a power level mode may be a reference power level parameter that affects and/or reflects a power level of the power transfer signal.

Similarly, the first reference value may be represented by any parameter of e.g. the drive signal or the transmitter coil signal that affects the power level of the power transfer signal, and specifically the amount of power transferred to the power receiver. The first reference value may specifically be a current, voltage, frequency, power, duty cycle, and/or active duration (burst mode) of the drive signal and/or a current, voltage, frequency, power, duty cycle, and/or active duration (burst mode) of the of the signal of the transmitter coil. In many embodiments, the first reference value may be indicated by a coil current of the transmitter current. The first reference value may be for the same parameter as the reference power level for the power level mode indicated in the mode request message or may be for a different parameter (in which case the mode circuit may convert between the parameters).

The power loop controller may be arranged to control the drive signal by adapting a parameter thereof which affects the power level of the power transfer signal such as a current, voltage, frequency, power, duty cycle, and/or active duration (burst mode) of the drive signal.

A parameter affecting the power level of the power transfer signal may specifically have a one-to-one monotonous relationship with the power level of the power transfer signal (at least within the operating range).

The receiver for receiving messages from the power receiver may also be referred to as a message receiver (for receiving messages from the power receiver).

In accordance with an optional feature of the invention, a duration for adapting the drive signal to set the power level of the power transfer signal to the first reference value is less than a time constant of the power control loop.

The approach may allow a faster adaptation of the power transfer operation to changes in the operation of the power transfer.

In accordance with an optional feature of the invention, the mode store is arranged to store a plurality of parameters for at least one power level mode, the plurality of parameters including at least one reference power level representing a power level of the power transfer signal and at least one parameter value for at least one of the drive signal and a signal of the transmitter coil, the at least one parameter value being a value of the for at least one of the drive signal and a signal of the transmitter coil for the power level of the power transfer signal indicated by reference power level.

This may provide improved performance in many embodiments. For example, the power transmitter may store both a reference power level in the form of a power that is extracted by a power receiver. In addition, the power transmitter may store a signal parameter value for the drive signal or the transmitter coil signal which will result in a corresponding power level of the power transfer signal. For example, a frequency of the drive signal may be stored that produces the desired power level. It will be appreciated that this may be considered equivalent to the mode store storing a plurality of reference power levels for a given power level mode, or that the stored reference power level for a given power level mode may comprise a plurality of components.

In accordance with an optional feature of the invention, the power transmitter further comprises a detection circuit for detecting a power transfer anomaly in response to a comparison of a current power level of the power transfer signal and a reference power level for a current power level mode of the plurality of power level modes.

The approach may allow improved operation and may specifically allow anomalies such as faulty situations to be detected, thereby allow the system to react to such situations.

In some embodiments, the detection circuit is arranged to change a parameter of the power transfer in response to the detection of the power transfer anomaly.

This may provide improved performance in many embodiments and allow the system to e.g. compensate for anomalies such as potential faults. The detection circuit may specifically reduce a maximum power limit for the power transfer signal and/or terminate an ongoing power transfer.

In accordance with an optional feature of the invention, the mode circuit is arranged to determine the reference power level for at least some power level modes of the plurality of power level modes in relation to at least one of a parameter value of the drive signal and a parameter value of the power transfer signal properties during an initialization phase in which the power receiver steps through the at least some power level modes, and the mode store is arranged to store the reference power level for the at least some power level modes.

This may provide particularly efficient operation in many embodiments and scenarios and allow e.g. a power transmitter to adapt to different power receivers without requiring pre-stored information.

The parameter value of the drive signal and/or the transmitter coil signal may be a measured parameter or may be a parameter set by the power transmitter during operation in the initialization phase. For example, a parameter value may be the frequency, current, voltage, duty cycle, power of the drive signal and/or the transmitter coil signal during the operation in a power level mode during the initialization phase.

The measurements of drive signal properties and measurements of power transfer signal properties may for example be measurements allowing a suitable parameter used to indicate the reference power level to be determined, such as e.g. a transmitter coil current.

In accordance with an optional feature of the invention, the initialization phase is prior to a power transfer phase.

This may provide improved operation in many embodiments.

In accordance with an optional feature of the invention, the receiver is arranged to receive a power receiver configuration message from the power receiver, the power receiver configuration message comprising a power receiver configuration parameter; and the mode circuit is arranged to determine the reference power level for at least one power level mode of the plurality of power level modes in response to the power receiver configuration property. This may provide improved operation in many embodiments. It may in many embodiments and scenarios allow the power transmitter to sufficiently accurately estimate suitable reference power levels for the specific power receiver. The approach may allow the power transmitter to adapt to the specific power receiver.

In accordance with an optional feature of the invention, the power receiver configuration parameter comprises at least one of: a power receiver identity; a power receiver type identity; a power receiver coil property; a power receiver coil dimension property; a power receiver coil inductance property.

These parameters may provide a particularly advantageous adaptation in many embodiments.

In accordance with an optional feature of the invention, the mode circuit is arranged to determine a coupling factor between the power transmitter coil and a power receiver coil of the power receiver based on the power receiver configuration parameter, and to determine the reference power level for the at least one power level mode based on the coupling factor.

This may provide particularly advantageous operation and/or performance in many embodiments and scenarios.

In accordance with an optional feature of the invention, the mode circuit is arranged to determine a power transfer function between at least one of a parameter of the drive signal and a parameter of a transmitter coil signal and an output power of the power receiver based on the power receiver configuration parameter, and to determine the reference power level for the at least one power level mode based on the power transfer function.

This may provide particularly advantageous operation and/or performance in many embodiments and scenarios.

In accordance with an optional feature of the invention, the mode store is arranged to store sets of power level modes for different power receivers, and the mode circuit is arranged to select between the sets of power level modes in response to an identity indication received from the power receiver. This may provide improved operation in many embodiments.

In accordance with an optional feature of the invention, the mode request message comprises a timing indication, and the mode circuit is arranged to adapt a timing of setting the power level of the power transfer signal in response to the timing indication.

This may provide particularly advantageous operation and/or performance in many embodiments and scenarios. The timing indication may be indicative of one or more changes of power level mode by the power receiver.

In accordance with an optional feature of the invention, the mode request message is received during a power transfer phase.

This may provide particularly advantageous operation and/or performance in many embodiments and scenarios.

According to another aspect of the invention, there is provided method of operation for a power transmitter for wirelessly providing power to a power receiver via an electromagnetic power transfer signal, the power transmitter comprising an output circuit comprising a transmitter coil for generating the power transfer signal in response to a drive signal being applied to the output circuit; the method comprising: receiving messages from the power receiver; generating the drive signal; operating a power control loop controlling the drive signal to adjust a power level of the power transfer signal, the power control loop being arranged to apply changes to the power level of the power transfer signal in response to power control error messages received from the power receiver; storing, in a mode store, a plurality of power level modes for the power receiver, each power level mode being associated with a reference power level for the power transfer signal; adapting the drive signal to set the power level of the power transfer signal to a first reference value in response to receiving a mode request message, the first reference value corresponding to a reference power level for a first power level mode out of the plurality of power level modes indicated in the mode request message.

According to another aspect of the invention, there is provided wireless power transfer system comprising a power transmitter for wirelessly providing power to a power receiver via an electromagnetic power transfer signal; the power transmitter comprising: a receiver for receiving messages from the power receiver; an output circuit comprising a transmitter coil for generating the power transfer signal in response to a drive signal being applied to the output circuit; a driver circuit for generating the drive signal; a power loop controller for controlling the drive signal to adjust a power level of the power transfer signal, the power control loop being arranged to apply changes to the power level of the power transfer signal in response to power control error messages received from the power receiver; a mode store arranged to store a plurality of power level modes for the power receiver, each power level mode being associated with a reference power level for the power transfer signal; a mode circuit arranged to adapt the drive signal to set the power level of the power transfer signal to a first reference value in response to receiving a mode request message, the first reference value corresponding to a reference power level for a first power level mode out of the plurality of power level modes indicated in the mode request message.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
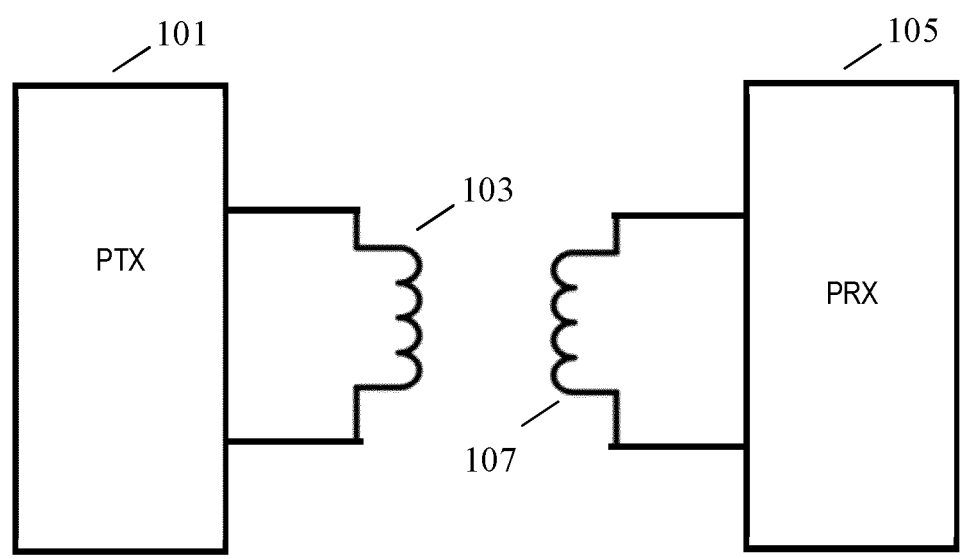
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103 (which is typically part of an output circuit in the form of a resonance or tank circuit). The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receiver coil 107, no power will be extracted by the power receiver from the generated electromagnetic field (apart from losses). In such a scenario, the driving of the transmitter coil 103 may generate an electromagnetic field of potentially high field strength but the power level of the power transfer signal will be zero (apart from losses). In some situations, where a foreign object is present, the power transfer signal may be considered to include a component corresponding to the power transfer to the foreign object, and thus the power transfer signal may be considered to correspond to the power being extracted from the electromagnetic field generated by the power transmitter.

The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal).

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the baseline power profile), up to 15 W for Qi specification version 1.2, in the range up to 100 W for higher power applications such as power tools, laptops, drones, robots etc., and in excess of 100 W and up to more than 1000 W for very high-power applications, such as e.g. high power applications supported by the Cordless Kitchen standard being developed by the Wireless Power Consortium.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 or suitable for the higher power Cordless Kitchen specification (except for the herein described (or consequential) modifications and enhancements).

Figure 2:
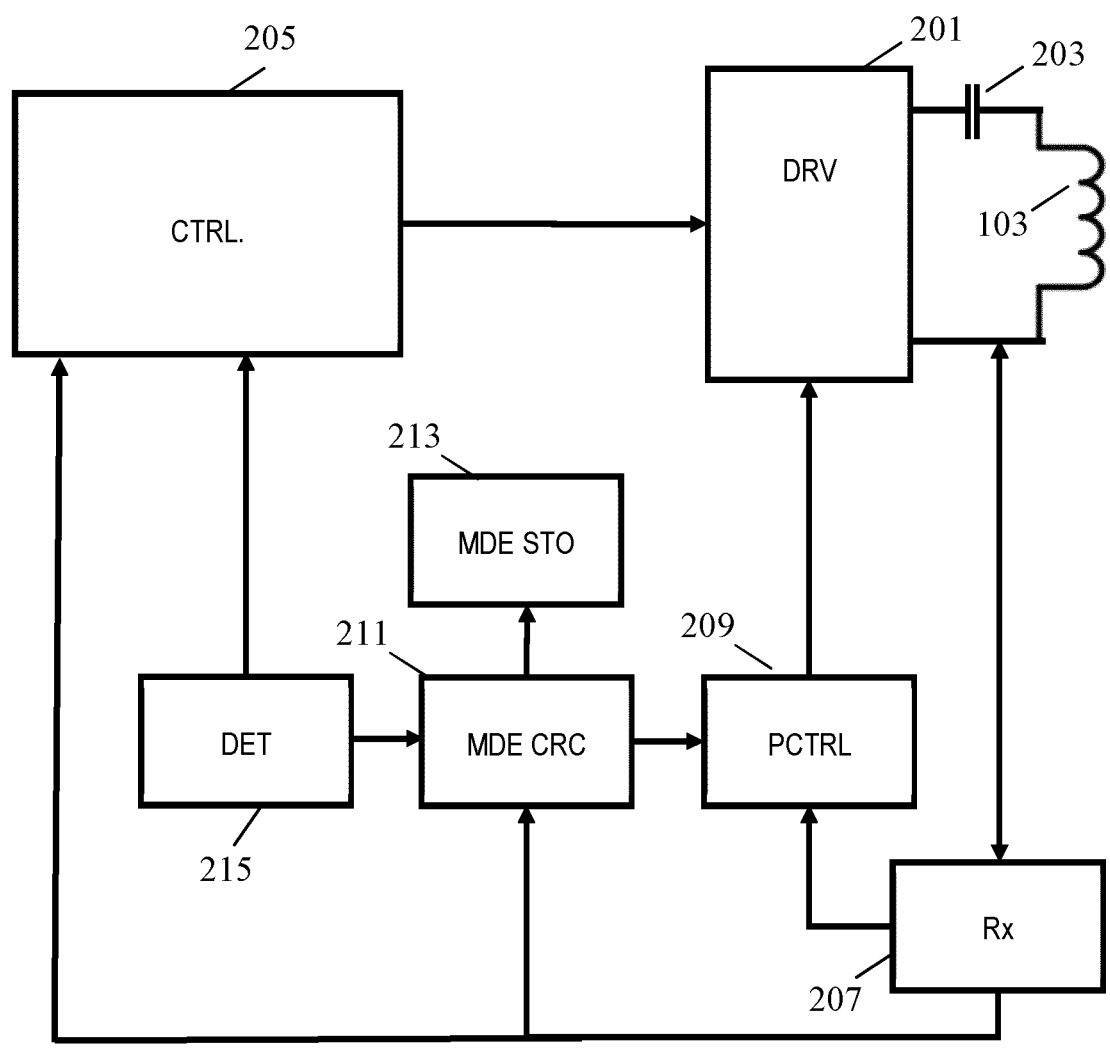
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to an output circuit which in the example is a resonance circuit formed by the transmitter coil 103 and a transmitter capacitor 203. The transmitter coil 103 is driven by the drive signal and this causes an electromagnetic field to be generated. Thus, an electromagnetic power transfer signal which provides power transfer to the power receiver 105 is generated. The power transfer signal is provided (at least) during a power transfer phase.

Figure 3:
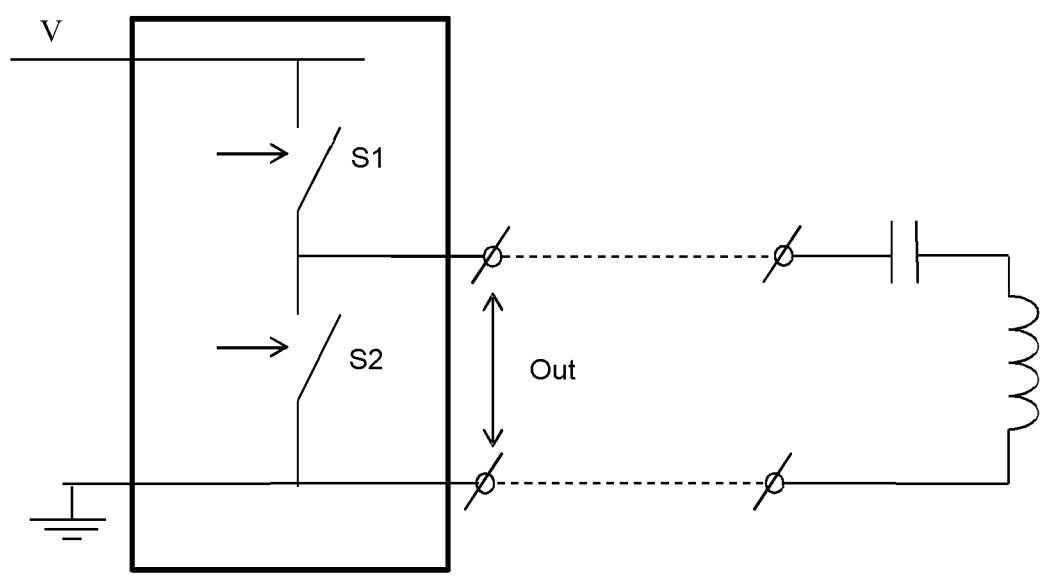
FIG. 3 illustrates an example of elements of an output stage of a power transmitter.
Figure 4:
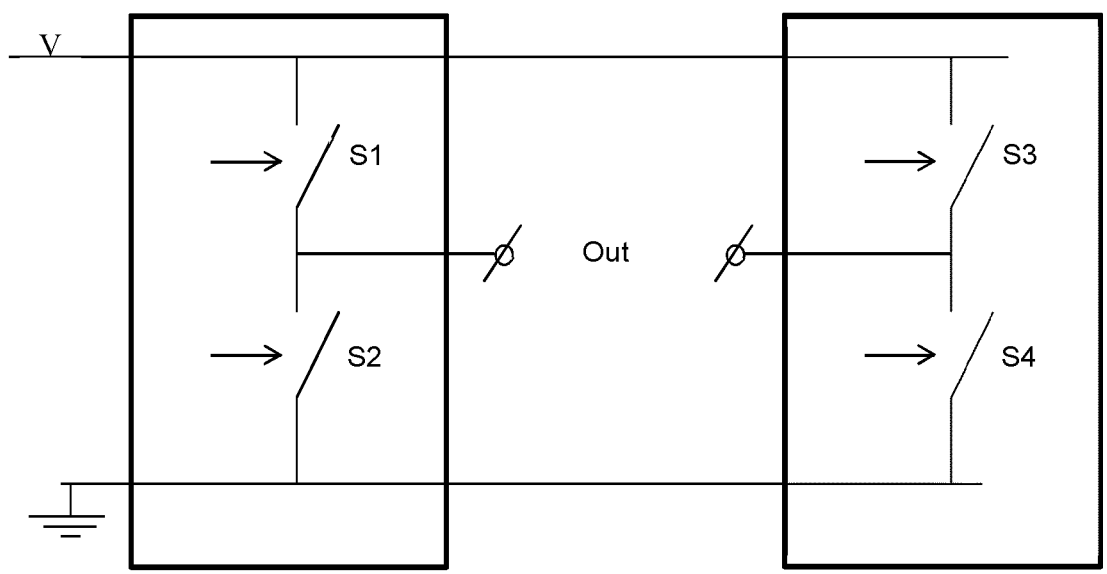
FIG. 4 illustrates an example of elements of an output stage of a power transmitter.

The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

In some implementations, S1 and S3 may be open and S2 and S4 may be closed in part of the period, and vice versa for another part of the period. This is known as phase control. Such an approach will create a square wave with a zero level in between. The drive circuit may be implemented using discrete electronics and with the output circuit being formed by solid state switches, such as transistors. However, it will be appreciated that other implementations are possible including e.g. forming the output circuit using integrated switches or even mechanical switches.

The drive circuit may for example be implemented as an integrated circuit such as an Application Specific Integrated Circuit (ASIC). In some embodiments, the circuit may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The driver 201 thus generates a drive signal for the output resonance circuit and thus for the transmitter coil 103. The drive signal causes a current to flow in the transmitter coil and this results in the electromagnetic power transfer signal being generated. The drive signal typically has a (substantially) constant voltage amplitude for a given power transfer configuration. In the example, the constant voltage amplitude is achieved by setting a constant rail voltage for the output circuit of the driver, i.e. the rail voltage V for the bridges of FIGS. 3 and 4 is constant for a given power transfer configuration. The switching by the bridge transistors respectively switches the output voltage between 0 and V for the half bridge and between V and −V for the full bridge. Thus, in the example the power transmitter may set the rail voltage to be constant for any given power transfer configuration but to (possibly) vary between power transfer configurations.

The power transmitter 101 further comprises a power transmitter controller 205 which is arranged to control the operation of the power transmitter 101 in accordance with the desired operating principles. Specifically, the power transmitter 101 may include many of the functionalities required to perform power control in accordance with the Qi Specifications, including interacting with the power receiver, providing a user interface etc. as appropriate for the specific application and specification.

The power transmitter 101 further comprises a first communicator 207 which is arranged to receive data and messages from the power receiver 105 (as will be appreciated by the skilled person, a data message may provide one or more bits of information). In the example, the power receiver 105 is arranged to load modulate the power transfer signal generated by the transmitter coil 103, and the first communicator 207 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

The first communicator 207 may further be arranged to transmit data to the power receiver e.g. by specifically modulating the drive signal and thus the power transfer signal using frequency, amplitude, and/or phase modulation.

It will be appreciated that other approaches for communicating data between the power transmitter 101 and the power receiver 105 may be used in other embodiments. For example, in some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

Figure 5:
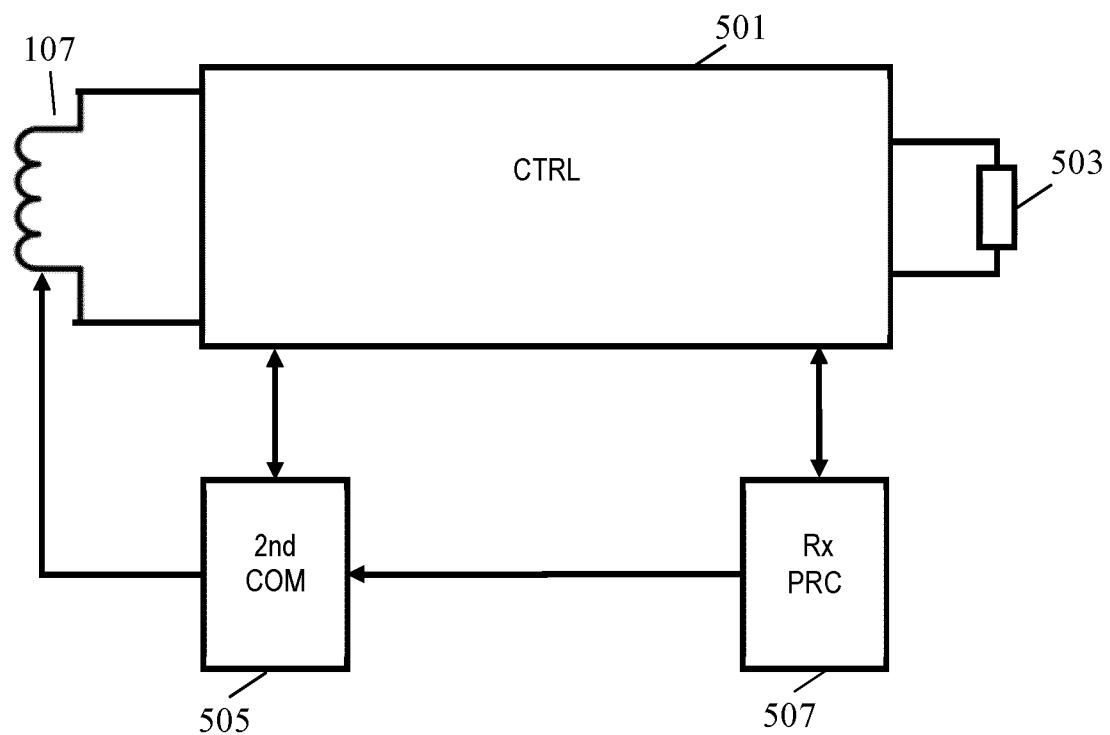
FIG. 5 illustrates an example of elements of a power receiver in accordance with some embodiments of the invention.

FIG. 5 illustrates some exemplary elements of the power receiver 105. The receiver coil 107 is coupled to a power receiver controller 501 which couples the receiver coil 107 to a load 503. In many embodiments, the receiver coil 107 is part of a power receiver input circuit which also includes a capacitor for forming a resonance circuit with the receiver coil 107. The power receiver controller 501 includes a power control path which converts the power extracted by the receiver coil 107 into a suitable supply for the load. In addition, the power receiver controller 501 may include various power receiver controller functionality required to perform power transfer, and in particular functions required to perform power transfer in accordance with the Qi specifications.

The power receiver 105 further comprises a second communicator 505 which is arranged to receive data transmitted from the power transmitter 101. In the example, the second communicator 505 is arranged to demodulate amplitude, frequency, and/or phase modulation of the power transfer signal as appropriate in order to retrieve data transmitted from the power transmitter.

The second communicator 505 is further arranged to transmit data to the power transmitter by varying the loading of the receiver coil 107 in response to data to be transmitted to the power transmitter 101. The load variations are then detected and demodulated by the power transmitter 101 as will be known to the person skilled in the art.

As previously mentioned, in other embodiments other communication methods may be used, such as e.g. a separate and dedicated short range communication approach such as NFC may be used.

The power transmitter and power receiver further comprise functionality for implementing a power control loop for dynamically adapting the power level of the power transfer signal during the power transfer phase. The power receiver may continuously monitor the received power level and compare it to a desired power level. It may then transmit power control error messages and the power transmitter may increase or decrease the power level by changing a property of the drive signal.

In particular, the power transmitter comprises a power loop controller 209 which is arranged to control a power level of the power transfer signal by adjusting a parameter/property of the drive signal. The power loop controller 209 may adjust a parameter, such as a current, voltage, frequency, duty cycle, active duration (burst mode), of the drive signal which will result in a changed power level of the power transfer signal.

The power loop controller 209 may for example be implemented as an integrated circuit such as an Application Specific Integrated Circuit (ASIC). In some embodiments, the power loop controller 209 may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

In some embodiments, the power loop controller 209 may be implemented partly or fully as a discrete electronic circuit. In different embodiments, the power loop controller may be implemented as an analog electronic circuit, as a digital electronic circuit, or as a mixed analogue circuit.

It will be appreciated that in different embodiments, different parameters may be used to represent power levels of the power transfer signal. For example, in many embodiments, a power level of the power transfer signal may be represented by a property or parameter of the transmitter coil signal, such as specifically a current, voltage, frequency, duty cycle, and/or power of the signal of the transmitter coil 103. In many embodiments, the power level of the power transfer signal may be given and represented by a coil current for the transmitter coil 103. In many embodiments, the power control loop may specifically control the power level of power transfer signal by controlling the level of the coil current through the transmitter coil 103.

In some embodiments, the power level of the power transfer signal may be represented by a property or parameter of the drive signal, such as specifically a current, voltage, frequency, duty cycle, active duration and/or power of the drive signal.

For example, increasing the current or the duty cycle for the drive signal will directly affect the signal of the transmitter coil 103, and thus the generated power transfer signal, thereby increasing the power level of the power transfer signal.

Indeed, the power level of the power transfer signal may be dependent on a number of parameters and any such parameter may in various embodiments be used to represent and/or control the power level of the power transfer signal. It will also be appreciated that different parameters may be used to represent the power level of the power transfer signal. For example, the power receiver and the power transmitter may use different parameters to represent a power level of the power transfer signal (for example, the power transmitter may use the current of the transmitter coil 103 and the power receiver may use an extracted power level). In such embodiments, conversions between different parameters and representations may for example be used, or data related to one parameter may be adapted by making relative changes to another parameter.

It will also be appreciated that the parameter which is controlled and adapted by the power control loop may be modified directly, or may be modified indirectly by changing another parameter. For example, the power control loop may control the coil current for the transmitter coil 103 but may do so by varying e.g. the frequency of the drive signal in order to change the coil current to the desired value.

Figure 6:
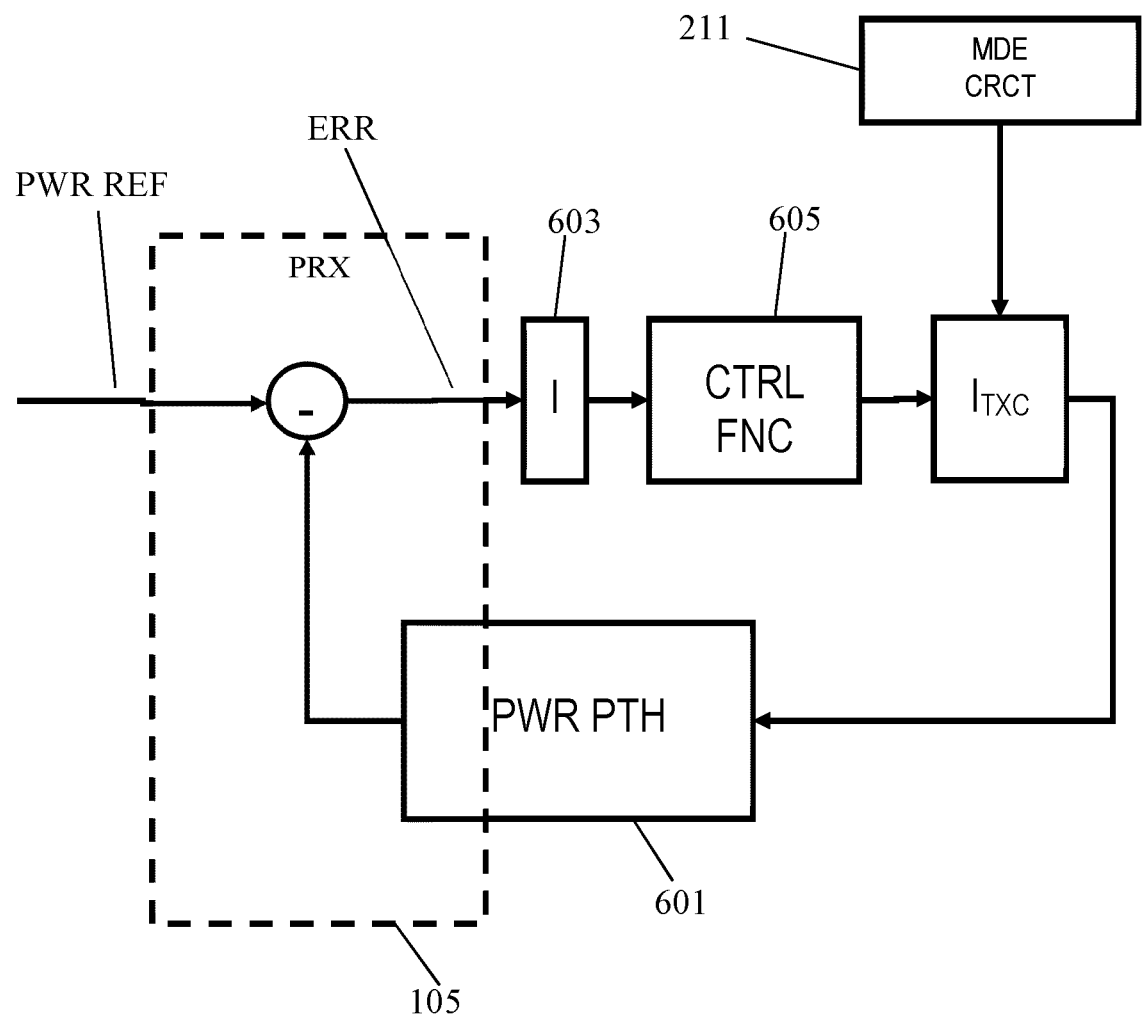
FIG. 6 illustrates an example of a power control loop of the power transfer system of FIG. 1.

FIG. 6 illustrates an example of functional aspects of an exemplary power control loop that may be employed in the system of FIG. 1.

The loop specifically controls the coil current $I_{txc}$, i.e. the coil current may be considered the loop output or the loop variable. The coil current $I_{txc}$ corresponds to a power level of the power transfer signal. Specifically, the flux and magnetic field strength generated by the transmitter coil 103 is directly given by the coil current and thus the signal induced in the receiver coil 107 is directly given by the transmitter coil current.

The loop thus includes a power path from the transmitter coil current to a power level extracted by the power receiver 105. This path includes the generation of the electromagnetic flux of the power transfer signal, the induction of a signal in the power receiver coil, the power receiver power path etc. The extracted power (e.g. fed to the load 503) is by the power receiver 105 compared to the desired (current) reference power level, PWR REF. Based on the comparison power control error indications ERR are generated and transmitted to the power transmitter 101 in power control error messages.

The power transmitter 101 comprises functionality for adapting the coil current $I_{txc}$, in response to the power control error indications. The changes of the power level of the power transfer signal, and in the specific example the coil current $I_{txc}$, are relative and accordingly the control loop may increase or decrease the power level from a current level in response to the power control error indications/messages. The relative changing of the power level/coil current corresponds to the inclusion of an integration function 603 in the power control loop.

Further, the power loop controller 209 and the power transmitter implements a certain power change circuit 605 for changing the power level in response to the power control error indications. For example, a power control error message may request the power level to be increased by a given relative amount, say 2%. In response the power change circuit 605 may determine that the coil current $I_{txc}$ should be increased by 2% and it may proceed to implement this change.

In many embodiments, the power level may be adapted by changing a property/parameter of the drive signal. Thus, the power change circuit 605 may include a circuit for changing a parameter of the drive signal such that this results in the desired change in the power level and specifically in the coil current $I_{txc}$.

Specifically, in many embodiments, the output circuit of the power transmitter and the input circuit of the power receiver comprise resonance circuits, and the power level of the power transfer signal and the coil current $I_{txc}$ is controlled by varying the drive frequency of the drive signal to be closer to or further away from the resonance frequency. In such an example, an increase in the coil current $I_{txc}$ may be achieved by changing the frequency to be closer to the resonance frequency.

Other parameters of the drive signal that may alternatively or additionally be modified include the current, voltage, power, duty cycle, or duration of the drive signal. Increasing either of these will result in an increased power level of the power transfer signal and decreasing them will result in a decreased power level.

In some embodiments, the power change circuit 605 may include a direct correspondence between the drive signal parameter and the power transfer signal level (including the coil current $I_{txc}$), for example if a request is received to increase the power level by 2%, the power change circuit 605 may directly change the drive signal frequency or current by a certain amount. Such direct correspondence may for example be based on look-up-tables generated during a manufacturing or calibration process.

In many embodiments, the power change circuit 605 may include an internal loop that controls the drive signal parameter to result in the desired change in the power transfer signal power level. For example, an internal loop may be implemented which changes the reference value for e.g. the coil current $I_{txc}$ in response to the received error power control messages. The internal loop may then adjust e.g. the drive signal frequency until the actual coil current $I_{txc}$ equals the desired new value.

It will also be appreciated that in many embodiments, the power levels may be real or active power levels. However, in other embodiments, the considered power levels may be complex, reactive, or apparent power levels.

The power control loop provides a very effective and reliable approach for the power receiver to control the power transfer operation. For example, it allows the power receiver to continuously adapt the transferred power level to e.g. maintain a desired speed for a load in the form of a motor.

The system of FIG. 1 further comprises additional functionality to control the operation of the power control loop in specific situations thereby providing improved operation in many scenarios.

Specifically, in the system, the power receiver may have a plurality of power level modes associated with the power transfer. Specifically, the power receiver may be associated with a set/plurality of power level modes where each power level mode is linked to a reference power level for the power transfer signal. The power receiver may be arranged to operate in different discrete modes with each of these modes having a given power level requirement from the power transfer signal. For example, a power receiver in the form of a blender may have, say, five different motor speed settings and therefore be associated with five different operating modes with each of these extracting a different amount of power from the power transfer signal.

The power transmitter 101 comprises a mode circuit 211 which is coupled to the power loop controller 209 and to a mode store 213. The mode store 213 may be arranged to store data for the different power level modes. Specifically, the mode store 213 is arranged to store a set of power level modes for the power receiver where each power level mode is associated with a reference power level for the power transfer signal.

The mode circuit 211 may for example be implemented as an integrated circuit such as an Application Specific Integrated Circuit (ASIC). In some embodiments, the mode circuit 211 may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

In some embodiments, the mode circuit 211 may be implemented partly or fully as a discrete electronic circuit. In different embodiments, the power loop controller may be implemented as an analog electronic circuit, as a digital electronic circuit, or as a mixed analogue circuit.

The power level mode may be represented by different parameters in different embodiments and any suitable parameter that may indicate a power level may be used. For example, the reference power levels may be represented by values indicating the actual load provided to the load 503 by the power receiver. In other embodiments, the reference power levels may be indicated by the nominal power being extracted from the power receiver for a nominal operating condition, such as e.g. with no objects being present and with the power transmitter and power receiver having a nominal position with respect to each other. In yet other embodiments, the reference power levels may e.g. be represented by a value of a loop variable being controlled, such as specifically by a reference coil current value for the given mode. In yet other embodiments, the reference power levels may be represented by values of parameters of the power transmitter that are controlled to provide a desired power level. In many embodiments, reference power levels may be represented by values of properties of the drive signal, such as a current, voltage, frequency, duty cycle, active duration (burst mode), of the drive signal etc. All of these parameters may reflect the power level in various embodiments, and a change in the value of such a parameter may affect the power level of the power transfer signal. It will also be appreciated that in some embodiments, combinations of the parameters may be used (e.g. using different parameters for different power level modes).

In the system, the power receiver may operate in a discrete set of power level modes, and the mode store may store reference power levels for each mode.

In the system, the power receiver may switch to a different mode and may in in connection with this transmit a message to the power transmitter to inform this of the mode change. The power receiver may specifically transmit a mode request message which may indicate the power level mode to which the power receiver is switching (or desires to switch to). It will be appreciated that any form of indication may be used. For example, the power level modes may be associated with an individual identity and the mode request message may include the identity of the power level mode to which the power receiver is desiring to switch.

When the receiver 207 receives the mode request message it forwards the identity to the mode circuit 211 which proceeds to access the mode store 213 to retrieve the reference power level for the identified power level mode. The mode circuit 211 is arranged to adapt the drive signal to set the power level of the power transfer signal to this reference value, i.e. it may adapt the drive signal to result in the power transfer signal having a value corresponding to the retrieved reference value.

It will be appreciated that the reference value may be represented by any suitable value, and specifically may by any value or parameter that affects the power level of the power transfer signal, such as specifically the coil current $I_{txc}$. The value may be set directly or e.g. indirectly by adapting a current, voltage, frequency, duty cycle, active duration (burst mode) of the drive signal. Indeed, values of these parameters may in some embodiments themselves be considered to be a reference value that is set by the mode circuit 211 and which affects the power level of the power transfer signal.

The first reference value is dependent on the reference power level for the indicated power level mode. Thus, when receiving a mode request message, the mode circuit 211 may retrieve the reference power level for the power level mode indicated in the mode request message. It may then from this reference power level determine a reference value for a given parameter which is related to the power level of the power transfer signal (the power level of the power transfer signal depends on the value of parameter for which the first reference value is determined). The first reference value may specifically be determined for a loop parameter being a parameter representing the signal value at some point in the loop. The mode circuit 211 may then set a parameter of the drive signal so that the parameter attains the first reference value.

In many embodiments, this may be done directly. For example, in many embodiments, the reference value may directly be determined for a parameter of the drive signal, such as a current, voltage, frequency, duty cycle, active duration (burst mode), of the drive signal. The mode circuit 211 may then proceed to directly set the drive signal to the reference value. For example, the power receiver may shift into a specific power level mode and transmit a mode request message indicating this mode. The mode circuit 211 may directly determine that for this mode, a reference power level is stored which corresponds to a drive signal frequency of a given value, and it may immediately change the drive signal frequency to this value without any consideration of the current value of the frequency (or any other value). For example, assuming that the power transfer resonance circuits are tuned to, say, 100 kHz, a mode request message indicating mode 1 may for example directly result in the mode circuit 211 setting the drive signal frequency to 150 kHz, a mode request message indicating mode 2 may for example directly result in the mode circuit 211 setting the drive signal frequency to 160 kHz, a mode request message indicating mode 3 may for example directly result in the mode circuit 211 setting the drive signal frequency to 170 kHz etc.

In some embodiments, the reference value may be determined for a parameter that is not directly a parameter of the drive signal. For example, it may be a parameter of the transmitter coil signal, such as specifically the coil current $I_{txc}$. In such a case, the mode circuit 211 may adapt a parameter of the drive signal to result in the desired parameter value for the transmitter coil signal. This may in some embodiments be achieved by the mode circuit 211 using a direct relationship or function between the adapted property of the drive signal and the parameter of the transmitter coil signal, such as e.g. a direct relationship between the frequency of the drive signal and the coil current $I_{txc}$. The relationship may for example be stored in a look-up-table. However, in many embodiments, such a relationship may be difficult to determine, and the power transmitter may e.g. implement a fast internal loop. For example, the coil current $I_{txc}$ may be measured and compared to the desired first reference value, and the frequency of the drive signal may quickly be varied/adapted to result in the desired value of the coil current $I_{txc}$.

In many embodiments, the stored reference power level may directly be represented by the first reference value, i.e. the mode circuit 211 may directly retrieve the reference power level for the requested power level mode and use this as the reference value, i.e. it may directly set the reference parameter to this value. For example, in many embodiments, the mode store 213 may directly store a frequency for each of the power level modes and when a mode request message is received, it may directly extract the stored frequency value and set the drive signal to this frequency. In other embodiments, some conversion may be needed, and this may e.g. be achieved using look-up-tables that may e.g. be populated during a calibration phase.

In some embodiments, the mode store may store a plurality of parameters for each power level mode, such as both a parameter of the drive signal and an extracted power value. Thus, in such cases, the reference power level may include a plurality of components or equivalently the mode store may store a plurality of reference power levels for each power level mode. In such embodiments, the mode circuit 211 may use the appropriate parameter value, or even use a plurality of parameter values. For example, if the mode request message indicates that the power receiver switches to a power level mode extracting, say, 500 W, the mode circuit 211 may identify the power level mode corresponding to an extracted power of 500 W and retrieve the drive frequency stored for this power level mode.

The approach may provide a system which can very quickly adapt to different operating modes. The mode request messages may be transmitted during the power transfer phase and may thus provide a means for quickly changing the power transfer operating point. Typically, power adaptation is accomplished using the power loop control and while this is adapted to provide efficient operation it is typically relatively slow in order to provide reliable performance. The described operation provides a means of overriding the power control loop and specifically the power control loop may dynamically during the power transfer phase be changed/reinitialized to a new operating point that matches a new power level mode.

The mode circuit 211 may thus be arranged to adapt the drive signal by changing a power control loop variable in response to receiving the mode request message.

The mode circuit 211 is arranged to set the power level of the power transfer signal to a first reference value in response to receiving a mode request message. The power level of the power transfer signal is a state variable for the power control loop and thus the mode circuit 211 is arranged to set a state variable of the power control loop to a reference value in response to receiving a mode request message and with the reference value being dependent on the mode request message, and specifically being dependent on the power level mode that is indicated in the mode request message.

The adaptation of the signal may be independent of the operation of the power control loop and thus in response to the mode request message, the approach may overwrite the operation of the power control loop to re-initialize operation for the new power level mode.

In some embodiments, the mode circuit 211 may be arranged to change a power control loop state variable to adapt the drive signal to set the power level of the power transfer signal to a first reference value in response to receiving a mode request message, the first reference value corresponding to a reference power level for a first power level mode out of the plurality of power level modes indicated in the mode request message.

In some embodiments, the mode circuit 211 may be arranged to adapt the drive signal to set the power level of the power transfer signal to a first reference value in response to receiving a mode request message, the first reference value corresponding to a reference power level for a first power level mode out of the plurality of power level modes indicated in the mode request message, and the adaptation including changing a state variable of the power control loop.

In some embodiments, the mode circuit 211 may be arranged to adapt the drive signal by changing a state variable of the power control loop to set the power level of the power transfer signal to a first reference value in response to receiving a mode request message, the first reference value corresponding to a reference power level for a first power level mode out of the plurality of power level modes indicated in the mode request message.

In some embodiments, the mode circuit 211 may be arranged to adapt the drive signal by changing a state variable of the power control loop to set the power level of the power transfer signal to a first reference value in response to receiving a mode request message, the first reference value corresponding to a reference power level for a first power level mode out of the plurality of power level modes indicated in the mode request message.

The mode circuit 211 may be arranged to overwrite or replace a current value of a loop state variable by a reference value which is dependent on the power level mode indicated in the mode request message.

The adaptation of the drive signal/setting of the power level of the power transfer signal/change of the power level of the power transfer signal may be faster than achievable by the power control loop. A time constant/duration for adapting/setting the power level of the power transfer signal to the reference value in response to the mode request message may be shorter than a time constant/duration for the power control loop. In some embodiments, the setting of the power level may be a step change.

In many embodiments, a time constant of the power control loop may be no less than 250 msec, 500 msec, or even 1 second whereas the setting of the power level in response to the mode request message may have a lower duration and specifically may be less than 100 msec, 250 msec or 500 msec, respectively.

In many embodiments, a duration for adapting the drive signal to set the power level is less than a time constant of the power control loop, and in many embodiments it may be less than 50% or 25% of the time constant. The duration may be a delay from the mode request message is received until the power level of the power transfer signal is set to the first reference value (and specifically until it has attained the first reference value). The time constant for a control loop reflects the speed at which the loop reacts to chances. The time constant may be the duration for a loop variable (such as specifically the power level of the power transfer signal) to reach 63.2% of the final (steady state) value following a step change.

It will be appreciated that, as will be described in more detail later, different approaches may be used for the power transmitter to determine and store the power level modes and the associated reference levels.

In some embodiments, power level modes and reference power levels may be stored for a plurality of power receivers. Thus, the mode store 213 may be arranged to store sets of power level modes for different power receivers.

When initializing a power transfer operation (or indeed at any suitable time), the power receiver may transmit an indication of the power receiver. The mode circuit 211/the mode store 213 may then proceed to retrieve the set of power level modes that matches the specific identity.

In some embodiments, the identity may be a unique device identity. This may for example be very useful in embodiments where the stored power level modes and reference power levels are determined by individual initialization with individual devices. For example, when a new power receiver is detected, the power transmitter may initiate a initialization routine that determines power level modes and reference power levels. The next time the power receiver is detected, the power transmitter may proceed to not perform a initialization process but to use the already stored values. The power transmitter may then gradually build up data for suitable power receivers allowing the function to be used with less overhead and for a range of power receivers.

Alternatively or additionally, the identity may be a type identity for example indicating the model, make, etc. of the power receiver. The power transmitter may for example store power level mode data for a range of different types of appliances and when receiving a type identity, it may select the power level mode data that matches the received identity.

In some embodiments, the power level mode and reference power level data may be based on an initialization phase performed by the power transmitter and power receiver.

For example, in some embodiments, the initialization of a new power transfer (e.g. only for power receivers for which no power level mode data is stored) may include first performing a process to determine the reference values to use during operation. During this initialization phase, the power receiver may step through the different power level modes and for each power level mode, the mode circuit 211 may determine a value representing the power level and store this as the reference power level for that mode.

For example, a predetermined timing may be applied for the power receiver to step through the power level modes, say e.g. operating for 10 seconds in each mode before switching to the next mode. Alternatively, the power receiver may send a message when it switches to the next mode or the power transmitter may send messages requesting that the next mode is applied.

For each power level mode, the power transmitter may operate the power control loop to reach a stable condition. When this has occurred, the power transmitter may measure the value of the desired parameter used to represent the power transfer signal power level, such as for example the coil current $I_{txc}$ or the drive signal frequency etc. This value may then be stored as the reference power level for that mode.

The power receiver may then switch to the next power level mode, e.g. at the request of the power transmitter, and the process may be repeated.

The approach may typically be performed by the power receiver stepping through the power level modes in order, and typically from lower towards higher power levels. This may for example reduce the risk of undesirable overvoltage conditions.

The initialization process may typically be performed as part of the power transfer initialization and thus be performed prior to the power transfer phase.

Figure 7:
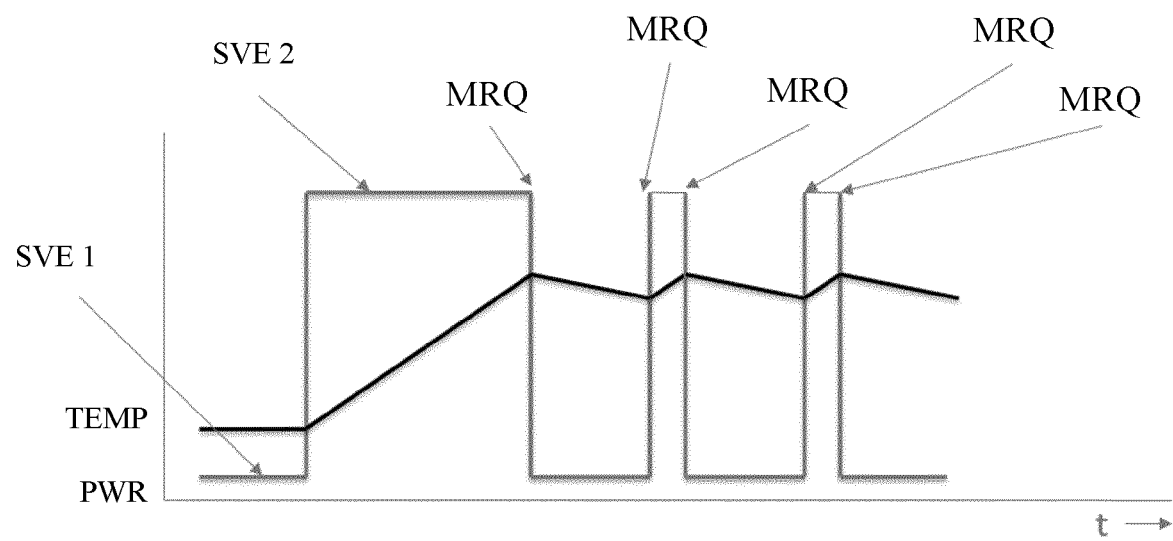
FIG. 7 illustrates an example of a power load variation for the power transfer system of FIG. 1.

As a specific example, an air fryer, which is a kitchen appliance that cooks by circulating hot air around the food using the convection mechanism, the heating element can be turned on and off. This typically results in a very large load step, such as e.g. from 50 to 1200 W and this will be repeated during operation of the device to keep the temperature constant. A schematic representation can be seen in FIG. 7 which shows the power steps PWR and the resulting temperature variation TEMP.

In this example, after the devices are turned on, and power transfer is ongoing with the power being controlled by the power control loop, the operating point can be saved (SVE 1 and 2). The operating point reflects the power transfer level of the power transfer signal for the current power level mode of the airfryer and may be represented by any suitable parameter value as previously described.

The values may be stored for both the high and low power level mode thereby providing the mode store 213 with reference power levels for the two different power level modes. The power receiver may then transmit mode request messages, MRQ, when it changes the power level mode thereby allowing the power transmitter to use the stored values to directly jump to (close to) the new operating point by overriding the power control loop.

Thus, when a change in power level mode is about to happen the power receiver can announce that a load change will happen and to which mode it will step. Then the system, and specifically the power transmitter, will know which operating point it should jump to. This will e.g. reduce the risk that due to the delay in the control loop, too much or too less power is transmitted. This may even in extreme situations help prevent damage to devices, or reduce the risk of the power receiver powering down.

Further, the stored data can be used for future power transfers between the power receiver and the power transmitter as the stored values may be stored and retrieved between the different power transfer operations. The mode store 213 may specifically store values for a plurality of power receivers and when a power receiver is detected for power transfer, it may proceed to use the set stored for this power receiver. If a new power receiver is detected, or if the stored data is considered invalid e.g. by being too old, the power transmitter and power receiver may proceed to generate and store new/updated data for the power receiver.

Thus, when the power transmitter/power receiver device combination and specific power mode will be used in the future, the actual used operating point can be reused. The operating values may as described be determined during startup or initialization by the system stepping through all the power level modes with the resulting operating point and reference power level being represented by any suitable parameter, the value of which is stored as a reference power level.

For example, for the air fryer, the heating element can be turned on or off, but the fan will always stay on. During startup of the appliance, only the fan is first turned on and that operating point is measured and saved, SVE 1. Then the heating element is turned on and the associated operating point is measured and stored, SVE 2. Then during operation, when the heating element is to be turned on/off, the power receiver may announce that a load change is about to happen and a mode request message MRQ for a different power mode is generated and transmitted to the power transmitter. Then the power transmitter can immediately step to the correct operating point without delay of the control loop. The power receiver may be informed that the power transmitter has switched to the correct power mode by receiving a handshake in form of a command.

In some embodiments, the power transmitter may further comprise a detection circuit 215 which is arranged to detect a power transfer anomaly in response to a comparison of a current power level of the drive signal and a reference power level for a current power level mode of the set of power level modes.

When operating in a specific power level mode, the power control loop may vary the power level of the power transfer signal in response to error control messages from the power receiver. However, these changes may be expected to be relatively small. For example, when the air fryer is operating in the 1200 W load mode, the exact extracted power may vary, and the power receiver may control this such that the exact desired power for the current conditions is extracted. However, whereas this power level accordingly may vary, the variations can be expected to be limited during normal operating conditions, for example the power may be expected to be in the range from 1100 W to 1300 W during normal operation.

Accordingly, the detection circuit 215 may compare the current power level to the reference power level stored for the power level mode that the system is currently operating in. For example, the detection circuit 215 may compare the currently measured coil current $I_{txc}$ to the coil current that is stored for the mode in which the system is operating.

If the comparison indicates that the current power level differs too much from the reference power level, e.g. the measured coil current differs by more than a threshold from the stored reference coil current value, then the detection circuit 215 may determine that the current operating point is not one that should be experienced during normal operation and an thus designate that an anomaly has been detected.

The detection circuit 215 may in such a case for example inform the transmitter controller 205 that an anomaly has been detected. In response, the transmitter controller 205 may proceed to vary a parameter of the power transfer. For example, it may be arranged to limit the power level to be below a given value, e.g. the maximum coil current $I_{txc}$ may be set to a level that is sufficiently low to ensure that no damage can occur. In some embodiments, the maximum power level may be set to zero, and specifically the power transfer may be terminated if an anomaly is detected.

It will be appreciated that the exact criterion used to detect the anomaly based on the comparison will depend on the preferences and requirements of the individual embodiment and that many different approaches and criteria are possible. It will also be appreciated that the evaluation may include other considerations and may for example include conversion between different parameters. For example, if the reference power level is stored as a coil current value but the current power level is set/measured based on the drive signal frequency, the comparison may include conversion between the coil current and the drive signal frequency.

It will also be appreciated that the action taken in response to a detection of an anomaly will depend on the preferences and requirements of the individual embodiment. For example, in some embodiments, the power transfer may be constrained or terminated. In other embodiments, the detection of an anomaly may simply result in the generation of a user alert, such as e.g. a warning light being switched on. In yet other embodiments, a message may be transmitted to the receiver which may then perform an action in response to this, e.g. it may modify the power provision to the load.

In some embodiments, the mode request message comprises a timing indication, and the mode circuit is arranged to adapt a timing of setting the level of the drive signal in response to the timing indication.

Specifically, the mode request message may include an indication of when the power receiver is intending to switch to the new power level mode. For example, the mode request message may indicate that the power receiver is switching to the new power level mode instantly, in which case the power transmitter may immediately switch to the new mode by setting the power level of the power transfer signal to the corresponding reference value, e.g. the coil current may be set to the stored reference value of the coil current for the new power level mode.

In other situations, the power receiver may transmit a mode request message which indicates that the change in the power level mode will occur at some time in the future, say in 5 seconds. In this case, the power transmitter may delay the setting of the power level for the indicated time, i.e. it may delay the setting of the power level to override the loop for 5 seconds.

In some embodiments, the timing indication may be indicative of a plurality of power level mode changes. For example, the mode request message may indicate that the power receiver will switch between two different modes (e.g. the two power level modes of an air fryer) at a given interval (say every 20 seconds), and the power transmitter may proceed to time the direct settings of the power level to correspond to these switches.

It will be appreciated that in some embodiments, the power transmitter may transmit a confirmation message to the power receiver that the setting of the power level has occurred or will occur and the power receiver may wait for such a confirmation message before switching between power level modes.

In some embodiments, the power transmitter may be arranged to determine the reference power levels based on data received from the power receiver.

In the example, the mode circuit 211 may thus receive information from the power receiver that allows it to calculate the reference power levels Specifically, the power receiver may provide a receiver configuration message comprising a power receiver configuration parameter. The mode circuit 211 may determine the reference power level for at least one power level mode of the set of power level modes based on the power receiver configuration property.

The power receiver configuration parameter may specifically comprise at least one of:
- a power receiver identity;
- a power receiver type identity;
- a power receiver coil property;
- a power receiver coil dimension property; and
- a power receiver coil inductance property.

The power receiver identity or type identity may allow the power transmitter to retrieve data which describes properties for this power receiver. The data may for example as previously described directly provide power level modes and reference power levels for the specific receiver. However, typically it will include properties of the power receiver which are indicative of the power processing of the power receiver. For example, an identity or type identity may allow the power transmitter to retrieve configuration data describing properties of the power receiver coil, such as e.g. a dimension or an inductance. Thus, power receiver coil properties may directly be transmitted by the power receiver or may be provided indirectly by identifying the power receiver and allowing the power transmitter to retrieve the relevant data. The data may in some embodiments be retrieved from an internal store or may in many embodiments be retrieved from an external server. For example, each manufacturer may provide a database which is accessible from a suitably equipped power transmitter (e.g. via the Internet).

In some embodiments, the received configuration data from the power receiver may be used to calculate suitable values for setting the parameter of the drive signal or the transmitter coil signal when a power level mode change occurs. For example, it may be used to calculate a drive signal frequency or duty cycle, or a coil current for different power level modes. The power level modes may for example be expressed in terms of load power values indicating the power provided to the load 503 by the power receiver, and the data received from the power receiver may be used to calculate the corresponding value of the power level parameter which is adapted by the mode circuit 211. For example, the data may be used to calculate the coil current required to provide the indicated power to the load 503.

Figure 8:
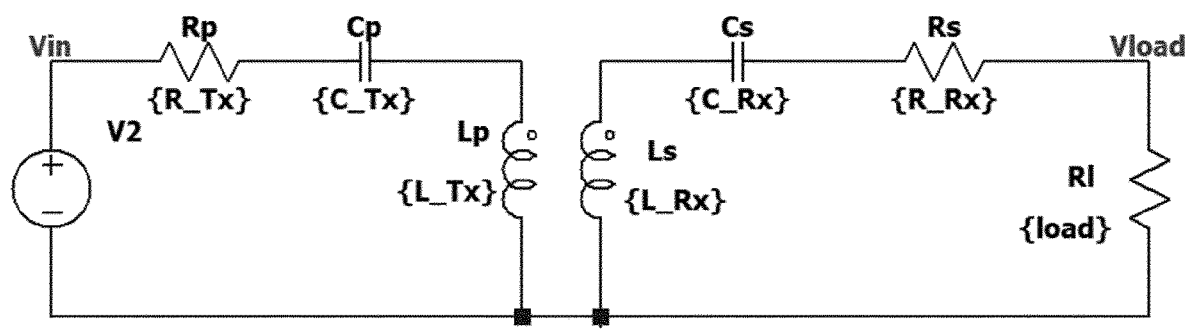
FIG. 8 illustrates an example of a model of the power transfer path for the power transfer system of FIG. 1.

The data may for example be used to determine a power path from the parameter being set in the power transmitter to the load of the power receiver. FIG. 8 illustrates an example of a model for the power path from the voltage of the driver 201 to the load 503.

In the example, the following references are used:
Vin: Voltage of drive signal from driver 201.
Rp: Internal resistance of the driver and losses in the output circuit.
Cp: Capacitor 203 of the power transmitter resonance output circuit.
Lp: Transmitter coil 103.
Ls: Receiver coil 107.
Cs: Capacitor of the power receiver input resonance circuit.
Rl: Load 503.

One of the key parameters for the power transmission in a wireless power transfer system is the coupling factor between the power transmitter coil and the power receiver coil. This may depend on a number of factors including receiver coil properties. The power receiver configuration data may accordingly be used to determine a coupling factor between the power transmitter coil and a power receiver coil. The mode circuit 211 may determine one or more reference power levels for the at least one power level mode based on the coupling factor.

For example, the power transmitter may store a number of reference power levels that correspond to a reference power receiver and a nominal power level mode. However, for each of the power level modes, different reference power levels may be stored for different coupling factors as this is a significant value in determining however power transmitter parameters relate to the extracted power level. The received information may then be used to calculate the coupling factor for the current power receiver and the power transmitter may accordingly retrieve the reference power level that matches the current coupling factor In some embodiments, the mode circuit 211 may be arranged to determine a power transfer function between the relevant parameter of the drive signal or of the transmitter coil signal and an output power from the power receiver to the load. The power transfer function may thus reflect a relationship between the parameter being set by the mode circuit 211 and the resulting power receiver output power. This power transfer function may then be used to directly calculate reference values for the desired parameter from the load power from the power receiver.

The power transfer function is thus calculated from the power receiver configuration data transmitted from the power receiver and the determination of the power transfer function may specifically include a determination of the coupling factor between the power transmitter coil and the power receiver coil.

In more detail, the power receiver configuration data can be used to fill in the unknown values Cs, Ls, Rs and Rl of FIG. 8. The power transmitter configuration data can be used to fill in Rp, Cp, and Lp. The coupling factor determines the shared flux path between Ls and Lp. This can be estimated/calculated by using the dimensions of the coils setup. With the coil diameters and distance between the two, simulations/measurements can be performed to see the influence on the coupling factor. Then a function/lookup table can be made to output the coupling factor at certain coil dimensions and placements. The coupling factor can also be measured by disconnecting the load on one side and supply a voltage/current on the other side. Since the load is disconnected no power will be transmitted, but a voltage will be present and that indicates the size of the mutual inductance with respect to self inductance. With all the models values the Kirchhoff laws can be used to derive the transfer function from input voltage to output current/voltage. Based on these values the power supplied to the load can be determined (or conversely the drive signal parameters for a given load can be determined).

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. A parameter or value corresponding to another parameter or value may indicate that one parameter/value is considered/expected/assumed to result in the other parameter/value Specifically, a parameter/value corresponding to a power level may mean that the parameter/value is one that is considered/expected/assumed to results in the power level. Reference signs in the claims are provided merely as a clarifying example shall not be construed as limiting the scope of the claims in any way.

The invention claimed is:

1. A power transmitter comprising:
a receiver circuit, wherein the receiver circuit is configured to receive at least one message(s) from;
an output circuit,
wherein the output circuit comprises a transmitter coil,
wherein the transmitter coils is configured to generate a power transfer signal,
wherein the power transfer signal is generated in response to a drive signal;
a driver circuit, wherein the driver circuit is configured to generate the drive signal;
a power loop controller circuit,
wherein the power loop controller circuit controls the drive signal so as to adjust a power level of the power transfer signal,
wherein the power control loop controller circuit is configured to apply changes to the power level of the power transfer signal in response to the at least one message(s);
a mode memory circuit,
wherein the mode memory circuit is configured to store a plurality of power level modes,
wherein each of the plurality of power level modes is associated with a reference power level;
a mode circuit,
wherein the mode circuit is configured to adapt the drive signal so as to set the power level of the power transfer signal to a first reference value in response to receiving a mode request message,
wherein the first reference value corresponds to a first reference power level of a first power level mode,
wherein the first power level mode is indicated in the mode request message,
wherein the first power level is one of the plurality of power level modes.

2. The power transmitter of claim 1, further comprising a detection circuit,
wherein the detection circuit is configured to detect a power transfer anomaly in response to a comparison of a current power level of the power transfer signal and the reference power level of a current power level mode,
wherein the current power level mode is one of the plurality of power level modes.

3. The power transmitter of claim 1,
wherein the power loop controller circuit utilizes a power control loop,
wherein a duration for adapting the drive signal is less than a time constant of the power control loop,
wherein the adaptation of the drive signal is configured to set a power level of the power transfer signal to the first reference value.

4. The power transmitter of claim 1,
wherein the mode circuit is configured to determine a second reference power level for at least one of the plurality of power level modes in relation to at least one of a parameter value of the drive signal and a parameter value of the power transfer signal properties,
wherein a power receiver steps through the at least one of the power level modes during an initialization phase,
wherein the mode memory circuit is configured to store the second reference power level mode.

5. The power transmitter of claim 4,
wherein the mode memory circuit is configured to store a plurality of parameters for at least one power level mode,
wherein the plurality of parameters include at least one reference power level and at least one parameter value,
wherein the at least one reference power level represents a power level of the power transfer signal,
wherein the at least one parameter value is for the drive signal and/or a signal of the transmitter coil in accordance with the at least one reference power level.

6. The power transmitter of claim 4, wherein the initialization phase is prior to a power transfer phase.

7. The power transmitter of claim 1,
wherein the receiver circuit is configured to receive a configuration message,
wherein the configuration message comprises a configuration parameter,
wherein the mode circuit is configured to determine the reference power level for at least one power level mode in response to the power receiver configuration parameter,
wherein the at least one power level modes is one of the plurality of power level modes.

8. The power transmitter of claim 7, wherein the configuration parameter comprises at least one of a power receiver identity, a power receiver type identity, a power receiver coil property, a power receiver coil dimension property and a power receiver coil inductance property.

9. The power transmitter of claim 7,
wherein the mode circuit is configured to determine a coupling factor between the power transmitter coil and a power receiver coil based on the configuration parameter,
wherein the mode circuit is configured to determine the reference power level for the at least one power level mode based on the coupling factor.

10. The power transmitter of claim 7,
wherein the mode circuit is configured to determine a power transfer function between a parameter of the drive signal and an output power of the power receiver based on the configuration parameter,
wherein the mode circuit is configured to determine the reference power level for the at least one power level mode based on the power transfer function.

11. The power transmitter of claim 7,
wherein the mode circuit is configured to determine a power transfer function between a parameter of a transmitter coil signal and an output power of the power receiver based on the configuration parameter,
wherein the mode circuit is configured to determine the reference power level for the at least one power level mode based on the power transfer function.

12. The power transmitter of claim 1,
wherein the mode memory circuit is configured to store a plurality of sets of power level modes,
wherein the plurality of sets of power level modes are for different power receivers,
wherein the mode circuit is configured to select a first set from the plurality of sets of power level modes in response to an identity indication received from a power receiver.

13. The power transmitter of claim 1,
wherein the mode request message comprises a timing indication,
wherein the mode circuit is configured to adapt a timing of setting the power level of the power transfer signal in response to the timing indication.

14. The power transmitter of claim 1, wherein the mode request message is received during a power transfer phase.

15. A method of operating a power transmitter comprising:
Receiving at least on message(s);
generating a drive signal;
operating a power control loop,
wherein power control loop controls the drive signal so as to adjust a power level of a power transfer signal,
wherein the power control loop applies changes to the power level of the power transfer signal in response to the at least one of the message(s);
storing a plurality of power level modes,
wherein each of the plurality of power level mode is associated with a reference power level,
wherein the reference power level of each of plurality of power level modes is for the power transfer signal;
adapting the drive signal so as to set the power level of the power transfer signal to a first reference value in response to receiving a mode request message,
wherein the first reference value corresponds to a first reference power level of a first power level mode,
wherein the first power level is indicated in the mode request message,
wherein the first power level is one of the plurality of power level modes.

16. A computer program stored on a non-transitory medium, wherein the computer program when executed on a processor performs the method as claimed in claim 15.

17. The method of claim 15, further comprising
detecting a power transfer anomaly in response to a comparison of a current power level of the power transfer signal and the reference power level of a current power level mode,
wherein the current power level mode is one of the plurality of power level modes.

18. The method of claim 15,
wherein a duration for adapting the drive signal is less than a time constant of the power control loop,
wherein the adaptation of the drive signal is configured to set a power level of the power transfer signal to the first reference value.

19. The method of claim 15, further comprising
determining of a second reference power level for at least one of the plurality of power level modes in relation to at least one of a parameter value of the drive signal and a parameter value of the power transfer signal properties, wherein a power receiver steps through the at least one of the power level modes during an initialization phase; and
storing the second reference power level mode.

20. The method of claim 19, further comprising
storing a plurality of parameters for at least one power level mode,
wherein the plurality of parameters include at least one reference power level and at least one parameter value,
wherein the at least one reference power level represents a power level of the power transfer signal,
wherein the at least one parameter value is for the drive signal and/or a signal of the transmitter coil in accordance with the at least one reference power level.

21. The method of claim 19, wherein the initialization phase is prior to a power transfer phase.

* * * * *